United States Patent [19]

Fordyce

[11] Patent Number: 4,646,673
[45] Date of Patent: Mar. 3, 1987

[54] DEVICE FOR INDICATING LOW TIRE PRESSURE

[75] Inventor: Douglas Fordyce, Miamisburg, Ohio

[73] Assignees: John R. Lewis, Camden; Ecquarican Enterprises, Inc., Trenton, both of Ohio

[21] Appl. No.: 530,862

[22] Filed: Sep. 9, 1983

[51] Int. Cl.⁴ .............................................. B60C 23/02
[52] U.S. Cl. ................................... 116/34 R; 137/227
[58] Field of Search ..................... 73/146.8; 116/34 R, 116/28 R, 285, 271; 137/227, 228, 229

[56] References Cited

U.S. PATENT DOCUMENTS

| | | | |
|---|---|---|---|
| 1,597,455 | 8/1926 | Mills | 137/227 X |
| 1,915,899 | 6/1933 | Monro et al. | 137/227 X |
| 4,203,467 | 5/1980 | Cardi | 73/146.8 X |
| 4,244,214 | 1/1981 | Curran | 73/146.8 |
| 4,375,788 | 3/1983 | Malec | 73/146.8 X |
| 4,465,013 | 8/1984 | Malec | 116/34 R |
| 4,476,803 | 10/1984 | Malec | 116/34 R |

FOREIGN PATENT DOCUMENTS 2653781  6/1981  Fed. Rep. of Germany ..... 73/146.8

Primary Examiner—Kenneth M. Schor
Attorney, Agent, or Firm—Becker & Becker, Inc.

[57] ABSTRACT

The device for indication of low pressure in tire inflation includes a hose which can be connected to the valve stem of the tire for communicating with the compressed air therein. A body is connected to and is in communication with the interior of the hose for receiving compressed air therefrom. An indicator is pivotably attached to the body remote from the hose. An actuating mechanism is disposed in the body and is responsive to the pressure of the compressed air for selectively holding the indicator in a first position during normal operation, and releasing the indicator, upon a drop in the pressure of the compressed air below a predetermined level, to allow the indicator to pivot and assume a second, low-pressure position. A spring is provided for effecting the pivotal movement of the indicator to the second, low-pressure position upon release of the indicator by the actuating mechanism.

12 Claims, 8 Drawing Figures

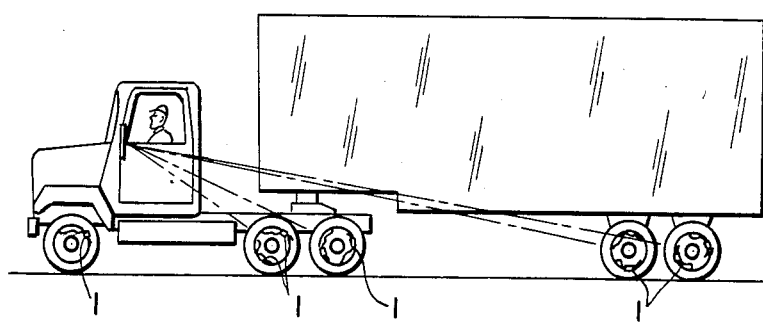
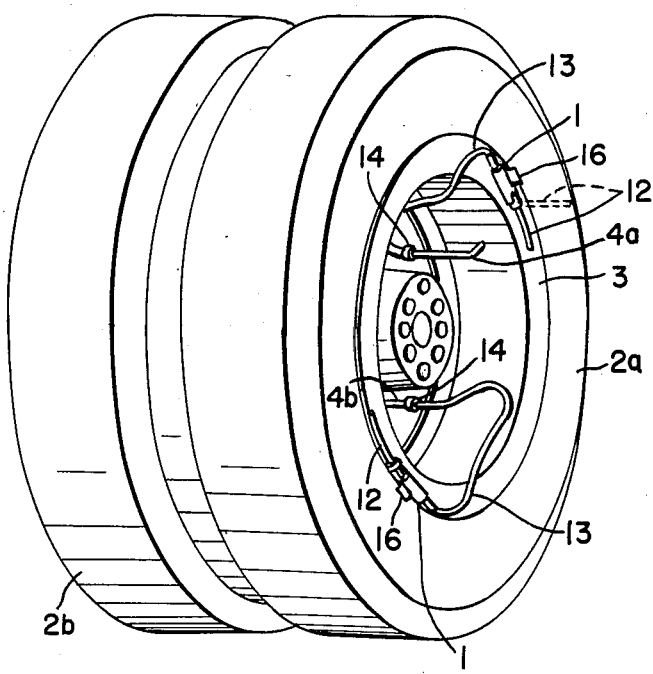
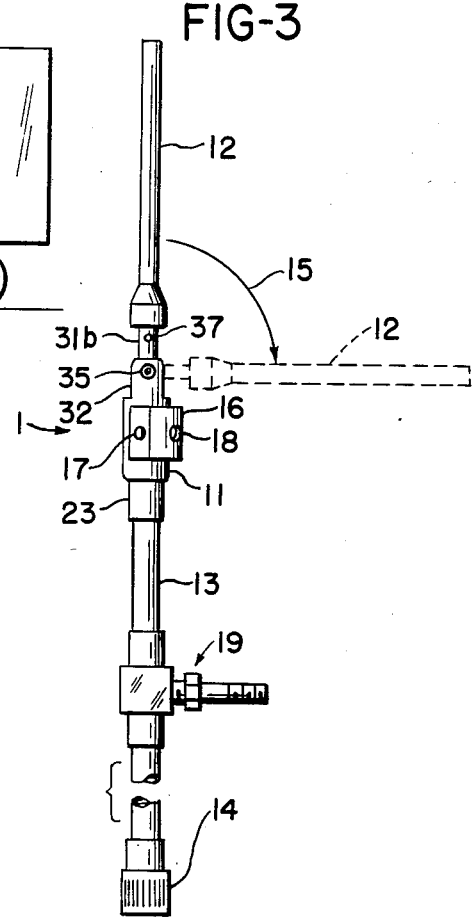
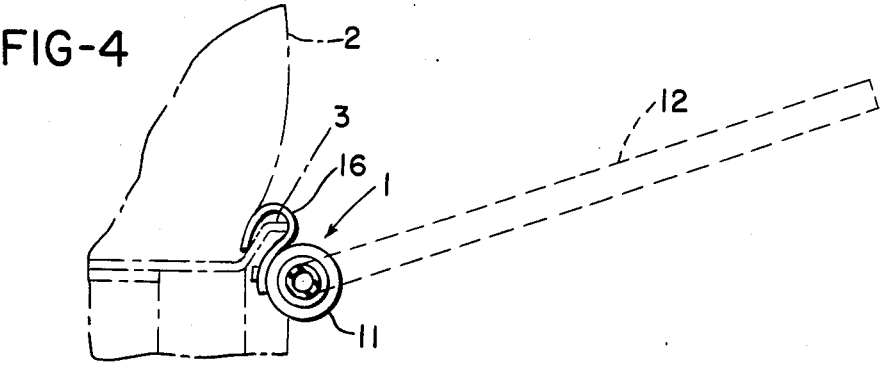

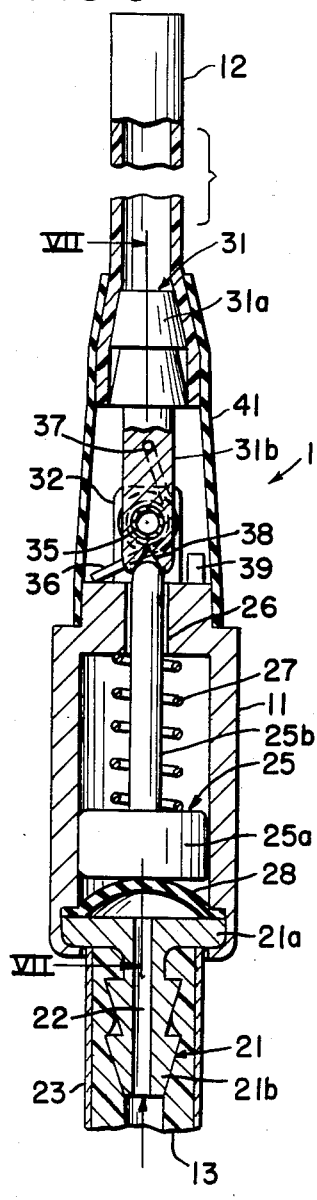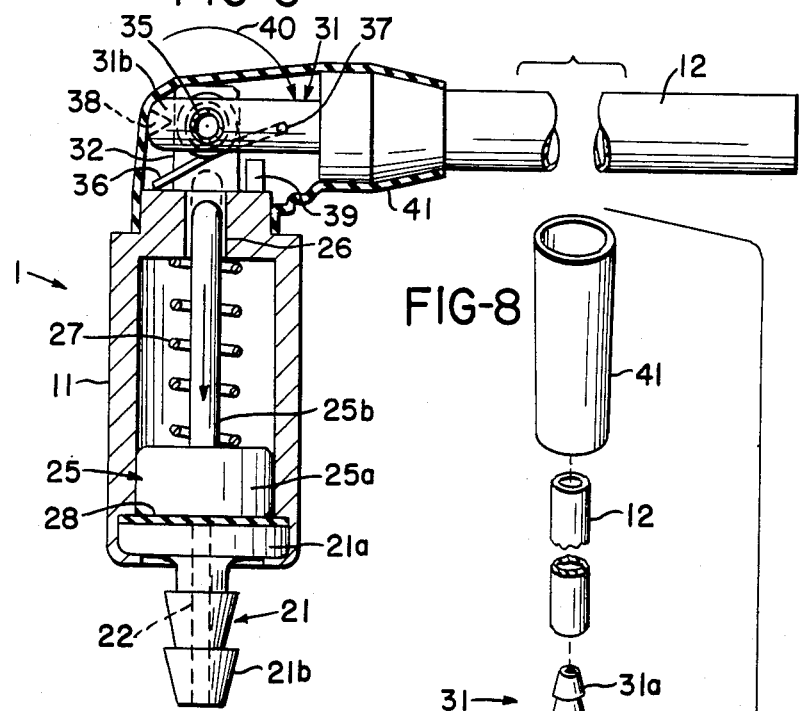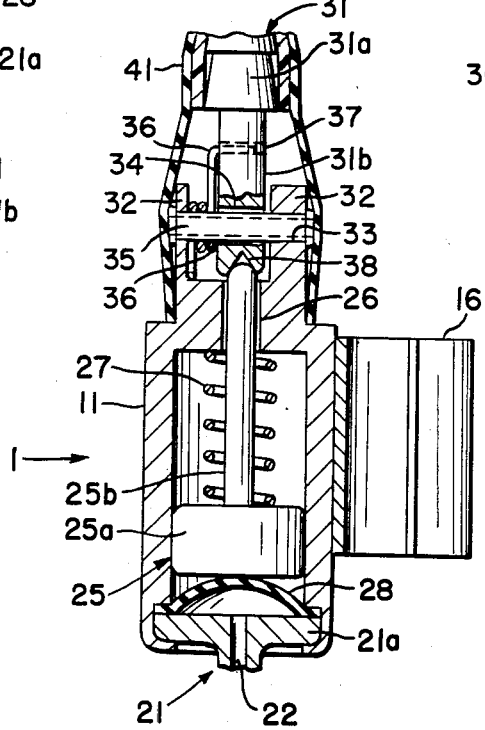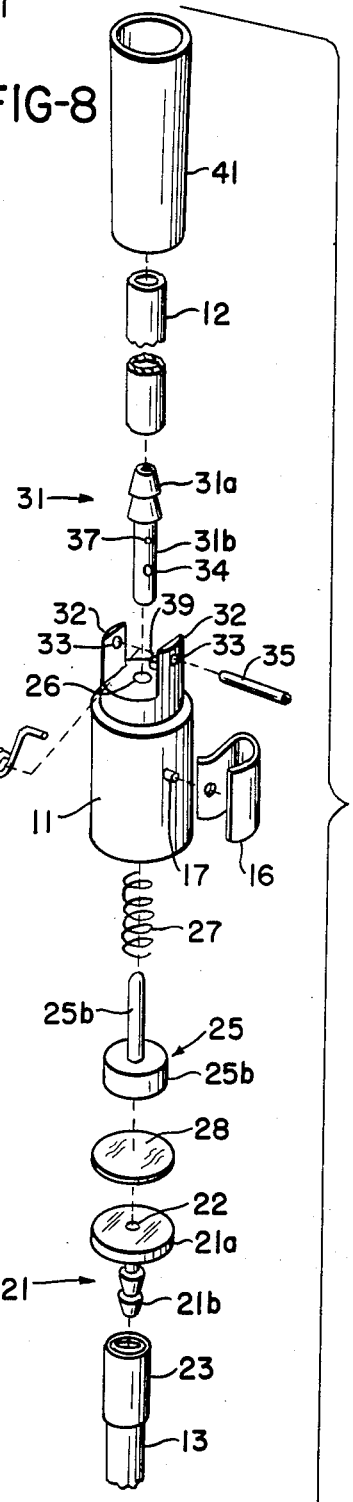

DEVICE FOR INDICATING LOW TIRE PRESSURE

BACKGROUND OF THE INVENTION

The present invention relates to a device for indicating low compressed air pressure in a tire.

1. Field of the Invention

It is very important to maintain correct tire pressure, or at least to keep the tire pressure above a predetermined minimum acceptable level. This is particularly true for the tire pressure in the tires of heavy-duty road vehicles, such as tractor-trailer rigs. The pressure in these tires is very high, customarily being in the range of from 100–110 psi. This high pressure is necessary in order to keep the tires from running flat, at which point centrifugal forces deform the tire and quickly cause failure thereof. This is, of course, to be avoided, on the one hand for the obvious reason of avoiding accidents, and on the other hand to avoid having to replace the tires, which are very expensive. Thus, for example in connection with such truck tires, there is necessary for the operator of such vehicles to know when the tires of the vehicle have less pressure than that for proper pressure of inflation of the tires; e.g., a readily visible indication is needed to warn when the tire pressure has dropped below a predetermined minimum level, such as 70 psi, and the driver should very quickly locate a service station so that the driver can again inflate or fill the tires to the proper pressure.

2. Description of Prior Art

No practical heretofore disclosed low tire-pressure indicating devices are known to applicant. As a matter of fact, truck drivers presently guess at their tire pressure by thumping the tires with a club, with the resulting sound being the only indication that the tire pressure is not what it should be.

An object of the present invention, therefore, is to provide a device for indicating low tire pressure, which device is not only practical and affordable, but also provides an accurate indication that the tire has or has not dropped below a predetermined minimum level at which more air should be added to the tires.

BRIEF DESCRIPTION OF THE DRAWINGS

This object, and other objects and advantages of the present invention, will appear more clearly from the following specification in conjunction with the accompanying drawings, in which:

FIG. 1 is a side elevational view that shows the line of sight of a driver of a tractor-trailer rig to the inventive low tire-pressure indicators, which are located on the outside tires;

FIG. 2 is a perspective view that shows two inventive indicators arranged on the outside tire of a twin tire arrangement, one associated with the valve stem of each tire;

FIG. 3 is an elevational view that shows the inventive indicator itself, as well as a supplemental valve stem unit;

FIG. 4 is a fragmentary view that shows the inventive indicator clipped to a wheel rim;

FIG. 5 is an enlarged cross-sectional side view of the inventive indicator during proper inflation;

FIG. 6 is an enlarged cross-sectional side view of the inventive indicator in a low pressure state;

FIG. 7 is a cross-sectional view taken along line VII—VII of FIG. 5; and

FIG. 8 is an exploded perspective view of the inventive indicating device.

SUMMARY OF THE INVENTION

The inventive device for indicating low compressed air pressure in a tire is characterized primarily by a hose which is connectable to the valve stem of a tire for communicating with the compressed air therein; by a body which is connected to and is in communication with the interior of the hose for receiving compressed air therefrom; by an indicator which is pivotably attached to the body remote from the hose; by actuating means disposed in the body and responsive to the pressure of the compressed air for selectively holding the indicator in a first position during normal operation, and releasing the indicator, upon a drop in the pressure of the compressed air below a predetermined level, to allow the indicator to pivot and assume a second, low-pressure position; and by means for effecting the pivotal movement of the indicator to the second, low-pressure position upon release of the indicator by the actuating means.

Pursuant to specific embodiments of the present invention, the body may be substantially cylindrical, with one end connected to and in communication with the interior of the hose, and with the other end being provided with an axial bore which passes entirely through this end; the actuating means may be partially disposed in the axial bore of the body, and may be adapted to engage the indicator to effect the holding thereof in the first normal operating position. The actuating means may include the following:

a piston displaceably disposed in the body and having a piston head which faces the hose, and a piston rod directed away from the hose toward the indicator, the piston rod extending in the axial direction of the body and being adapted to pass through and beyond the axial bore in the body for engagement with the indicator to effect the holding thereof in the first normal operating position;

a diaphragm disposed between the piston head and the hose on that side of the piston head remote from the piston rod, the diaphragm being acted upon by the compressed air to press against the piston head and urge the piston, and hence the piston rod, toward the indicator to effect engagement of the piston rod with the indicator; and a compression spring placed around the piston rod between the piston head and that portion of the body in which the axial bore is located, the compression spring urging the piston head, and hence the piston rod, in a direction away from the indicator against the force of the diaphragm, with the force of the compression spring overcoming the force of the diaphragm upon a drop in the pressure of the compressed air below a predetermined level, thus allowing displacement of the piston, and hence the piston rod, away from the indicator to release same, and to allow the indicator to pivot and assume the second, low-pressure position.

The pivotal connection of the indicator to the body may be effected by an elongate piece, one end of which is secured to the indicator, and the other end of which is pivotably attached to the body in the vicinity of the axial bore thereof. The body may have two ears in the vicinity of the axial bore, each of the ears being provided with a bore which passes entirely therethrough and extends perpendicular to the axis of the axial bore. The bores of the ears are aligned with one another. The elongate piece may be provided with a bore in the region of that end thereof remote from the indicator; and a pin may pass through the bores of the ears and through the bore of the elongate piece to effect the pivotable attachment of the elongate piece to the body. That end of the elongate piece remote from the indicator may be provided with an indentation for receiving that end of the piston rod remote from the piston head to effect the holding or retention of the indicator in the first normal operating position of the indicator so long as proper pressure of inflation of the tires exist therewith.

The means for effecting the pivotal movement of the indicator to the second, low-pressure position upon release of the indicator by the piston rod may be a torsion spring which is wrapped around the pin between one of the ears of the body and that end of the elongate piece remote from the indicator; the torsion spring may be operatively associated with the body and the elongate piece in such a way that when the indicator is released by the piston rod from the first position, the torsion spring effects pivotal movement of the indicator by urging thereof into the second, low-pressure position. Means may be provided for effecting the connection of the body with the hose, such means being in the form of a plug comprising a disclike portion secured to the body, and a stepped portion secured to the hose, the plug being provided with a bore which passes entirely through the disc-like portion and the stepped portion to effect the communication of the body with the interior of the hose.

A thin and very flexible boot may be placed around at least that portion of the device which accommodates the torsion spring. A clip may be fastened to the body for effecting attachment of the device to a wheel rim on which is mounted the tire with which the device is associated. A stop may be located on the body in the vicinity of the axial bore to prevent the indicator from being pivoted from the second position substantially past the first position.

A supplemental valve stem unit may be attached to the hose and is adapted to communicate with the interior thereof. The supplemental valve stem unit is adapted to be connected to a source of compressed air.

DESCRIPTION OF PREFERRED EMBODIMENTS

Referring now to the drawings in detail, FIG. 1 is a side elevational view that shows the line of sight which a driver has from a rear-view mirror on a left side of a vehicle such as a truck from a cab thereof to the inventive low tire-pressure indicating devices 1, with the latter is place on the outside tires of a tractor-trailer rig. Only a representative few of the devices 1 are indicated with a reference numeral. Inventive indicating devices on the outer tires on the right side similarly can be viewed from a rear-view mirror on a right side of the vehicle.

FIG. 2 illustrates the arrangement of two inventive devices 1 on the outer tire 2a of a twin tire assembly. In particular, both indicating devices 1 are mounted on the outwardly facing rear rim 3 of the outer tire 2a of the pair of tires 2a, 2b, with one indicating device 1 being further connected to the valve stem 4a of the outer tire 2a, and the other indicating device 1 being further connected to the valve stem 4b of the inner tire 2b. The dashed line representation of the indicator or flag 12 of the indicating device 1 shows the position attained by the indicator 12 when the pressure of the tire, in this case of the tire 2a, has fallen below a predetermined minumum level. The indicator 12 sticks out from the tire, making it clearly visible to the driver. The normal position of the indicator 12 is shown in solid lines; thus, during proper inflation of the tire, the indicator 12 is not visible to the driver when he looks into his side view mirror.

A general view of the inventive low tire-pressure indicating device 1 itself is shown in FIG. 3, while detailed views of the inventive device are shown in enlarged cross-sectional views in FIGS. 5, 6, and 7, and in an exploded perspective view in FIG. 8.

FIG. 3 shows the body 11 of the device 1, with the flag or indicator 12 pivotably attached to one end of the body 11, and a flexible, high-pressure hose 13 sealingly attached to the other end of the body 11. This flexible, high-pressure hose 13 should be able to withstand a working pressure of at least 150 psi, and should be reinforced, for example with a cloth or nylon webbing. That end of the hose 13 remote from a connection thereof to the body 11 is provided with a standard screw and valve-opening attachment 14 for connecting the hose 13 to the valve stem 4 of a tire to thus provide communication between the compressed air in the tire and the interior of the body 11. As is the case in FIG. 2, the low-pressure position of the indicator 12 is shown in dashed lines, with the arrow 15 showing the direction of pivot of the indicator 12 from the normal position thereof during proper inflation of an associated tire to the low-pressure position. Also shown is a rim clip 16, which may be riveted to the body 11 via a rivet 17. FIG. 4 shows how the rim clip 16 is placed on a wheel rim 3 for a tire 2 to thus associate the inventive device 1 with a tire. Again, the dashed lines indicate the actuated or low-pressure position of the indicator 12. The rim clip 16 also may be provided with a hole 18 (FIG. 3) to facilitate removal of the rim clip, and hence the device 1, from a wheel rim 3 via an appropriate tool.

Since the valve stems of dual tires are often inconveniently located (see 4a and 4b in FIG. 2), and in order to avoid the necessity for having to remove the inventive device 1 from a standard valve stem prior to being able to fill the tire with air (this constant necessary for repeated removal of the inventive device can cause leaks to develop at the valve stem and at the connection of the device 1 thereto), an in effect supplemental valve stem unit 19 can be provided in the hose 13, as illustrated in FIG. 3. The valve stem unit 19 is incorporated in the hose 13 in such a way that a compressed air hose can be connected to the unit 19 in the same way as it would be connected to a standard valve stem for filling the tire with air. The communication between the body 11 and the tire is maintained during use as previously described. The valve stem unit 19 is arranged in such a way that when the device 1 is in place on a tire, the unit 19 is readily accessible, so that the tire can be quickly and easily filled with air as needed.

The actual construction and manner of operation of the inventive indicating device 1 can be clearly seen from FIGS. 5-8. In order to effect connection of the flexible hose 13 to the body 11, a plug 21 is provided. This plug 21 comprises a disc-like portion 21a, and a stepped or crimped, substantially cylindrical portion 21b which is attached to or integral with the central part of one planar side of the disc-like portion 21a. The disc-like portion 21a of the plug 21 is placed into the body 11 through the open bottom end thereof, and that portion of the body 11 which surrounds the disclike portion 21a is then pressed inwardly to the position shown in FIGS. 5-7 to hold the disc-like portion 21a securely in the body 11. That portion of the body 11 which is to be bent inwardly around the disc-like portion 21a may be of greater diameter, i.e., may have a thinner wall, than the remainder of the body 11 in order to facilitate the bending process. Upon completion of securing the disc-like portion 21a in the body 11, the stepped portion 21b of the plug 21 is forced into one end of the hose 13. A clamp 23 is placed around that portion of the hose 13 in which the stepped portion 21b is located. This hose clamp 23 is then tightened, thus securely connecting the stepped portion 21b to hose 13, and completing the connection of the hose 13 to the body 11. Since the plug 21 is further provided with a central bore 22 which passes entirely through the disc-like portion 21a and the stepped portion 21b, the interior of the hose 13 is now in communication with the interior of the body 11.

The interior of the body 11 is further provided with actuating means for selectively holding the indicator 12 in a first position (FIG. 5) during normal pressure operation, and releasing the indicator 12 into a second position (FIG. 6) when the pressure in the tire falls below a predetermined "safe" level. This actuating means includes a piston 25 which is displaceably disposed in the body 11 and comprises a piston head 25a facing the disc-like portion 21a of the plug 21, and a piston rod 25b directed away from the disclike portion 21a and extending in the axial direction of the essentially cylindrical body 11. That end of the piston rod 25b remote from the disc-like portion 21a of the plug 21 is guided in an axial bore 26 located in that end of the body 11 remote from that end thereof which is secured to the plug 21. This axially disposed bore 26 passes entirely through the associated end portion of the body 11. The actuating means further includes a compression spring 27 placed around the piston rod 25b. The compression spring 27 is seated on the one hand on that side of the piston head 25a remote from the disc-like portion 21a, and on the other hand on that inner wall of the body 11 around the bore 26. The compression spring 27 urges the piston 25 in a direction toward the plug 21, i.e., away from the bore 26 and the indicator 12. Also forming prat of the actuating means is a flexible diaphragm 28, which is disposed between the disc-like portion 21a of the plug 21, and the piston head 25a of the piston 25; the diaphragm may be made of rubber or any other elastomeric material. This flexible diaphragm 28 may even be clamped-in between the disc-like portion 21a and the side wall of the body 11 if the body 11 has a thinner wall portion as described above. The diaphragm 28 acts as a seal to prevent compressed air from leaking out around the piston head 25a, as well as performing a function which is to be described subsequently.

The actuating means functions as follows. Assuming that the tire, relative to which the flexible hose 13 is connected as described, is inflated to a normal operating pressure, such as, for example, 100-110 psi, compressed air passing from the interior of the tire to the body 11 via the hose 13 and the bore 22 in the plug 21 presses against that side of the diaphragm 28 which faces the disc-like portion 21a of the plug 21. Assuming further that the compression spring 27 is of such a strength that a force of 70-80 psi will overcome spring force which urges the piston 25 toward the plug 21, the compressed air pressing against the diaphragm 28 will press the other side thereof against the piston head 25a, and will displace the piston 25 in a direction counter to the force of the compression spring 27, i.e., toward the axial bore 26 and the indicator 12. This displacement of the piston 25a forces the piston rod 25b further through the bore 26 in a direction toward the indicator 12. The actual holding of the indicator 12 in a first normal pressure position, and the releasing of the indicator 12 into a second low-pressure position, will be explained in detail subsequently.

The indicator 12 is formed, for example, by a tube of synthetic material. The stepped or crimped end 31a of an elongate piece 31 is forced into one end of the indicator tube 12 and is securely held therewith. The other end 31b of the elongate piece 31 is placed between two ears 32 formed on that end of the body 11 which is provided with the axial bore 26. These two ears respectively are provided with a bore 33 passed entirely therethrough and extending at right angles to the axis of the bore 26. The two bores 33 in the ears 32 are aligned with one another. The end 31b of the elongate piece 31 is also provided with a bore 34. When the bore 34 is aligned with the two aligned bores 33 of the ears 32, and a pin 35 is placed through all three bores, the end 31b of the elongate piece 31 is pivotably held in position between the two ears 32 of the body 11 in the vicinity of the axial bore 26 thereof (see also FIG. 7). The pin 35 can be riveted or otherwise securely fastened to the ears 32.

The central portion of a torsion spring 36 is wrapped around the pin 35 between one ear 32 of the body 11 and the end 31b of the elongate piece 31. One end of the torsion spring 36 rests on or is secured to that end of the body 11 which is provided with the axial bore 26, or to said one ear 32 of the body 11. The other end of the torsion spring 36 is secured in a bore 37 provided in the end 31b of the elongate piece 31 for this purpose. In a relaxed state thereof, the torsion spring 36 allows the indicator 12 to assume the low-pressure position illustrated in FIG. 6. If the indicator 12 is raised to the upright position of FIG. 5, the torsion spring 36 is tensioned, and wants to urge the indicator 12, in the direction of the arrow 40, into the position illustrated in FIG. 6. In order to hold the indicator 12 against the force of the torsion spring 36 in the raised position, which corresponds to the normal pressure position, that end of the end 31b of the elongate piece 31 remote from the end 31a of the elongate piece 31 is provided with a groove or indentation 38. When the indicator 12 is raised to the position of FIG. 5, i.e., is in axial alignment with the piston rod 25b and the body 11, the indentation 38 is directly over the axial bore 26 of the body 11 (FIGS. 5 and 7). Assuming that normal tire pressure exists, or at least a pressure which is high enough to overcome the force of the compression spring 27, the diaphragm 28 is acted on by compressed air from the tire and presses against the piston head 25a. This forces the piston 25 in a direction away from the disc-like portion 21a of the plug 21. Thus, that end of the piston rod 25b remote from the piston head 25a is pushed out through the axial bore 26 and engages in the indentation 38, which is contoured to receive the end of the piston rod 25b. Thus, the indicator 12 is held in the position illustrated in FIG. 5. This corresponds to the normal operating position illustrated by solid lines in FIG. 2, and the indicator 12 is not visible to the driver when looking in the side view mirror.

The compression spring 27 can, of course, be selected to have any desired strength. Thus, if the driver wishes to be alerted when the tire pressure drops below 70 psi, a compression spring 27 is used which begins to urge the diaphragm 28 toward the disc-like portion 21a of the plug 21 when the pressure drops below 70 psi.

If the indicating device 1 is now in the position illustrated in FIG. 5, with the end of the piston rod 25b engaging the indentation 38 of the end 31b of the elongate piece 31, and with the torsion spring 36 tensioned, and the pressure in the associated tire now drops below the predetermined level of 70 psi, then the compression spring 27 begins to urge the piston head 25a of the piston 25 against the diaphragm 28 in a direction away from the indicator 12. As the piston 25 moves away from the indicator 12, the piston rod 25b moves out of engagement with the indentation 38 of the end 31b of the elongate piece 31. Therefore, since the torsion spring 36 is in a tensioned state, the indicator 12, via the pressure of the torsion spring 36 on the end 31b of the elongate piece 31, is urged in the direction of arrow 40 into the position illustrated in FIG. 6. This corresponds to the low pressure dashed-line position illustrated in FIG. 2, so that the indicator 12 is visible to the driver when looking in the side view mirror, and thus the driver is alerted that he has a "low" tire. The driver then can stop at a service station and inflate to fill the tire with air to the desired pressure, avoiding permanent damage or even destruction of the tire. As indicated previously, this filling can be done either directly at the tire valve stem after the inventive device 1 has been disconnected therefrom, or preferably at a supplemental valve stem, such as the unit 19, which has been placed in the hose 13 of the device 1.

When the tire again has been inflated or filled with air to a proper operating pressure, such as 100–110 psi for heavy trucks, and any other suitable lower pressure for lighter vehicles, the indicator 12 again must be reset to the position of FIG. 5. This is accomplished by raising the indicator 12 from the position illustrated in FIG. 6 counter to the direction of the arrow 40 until that end of the piston rod 25b remote from the piston head 25a engages in the indentation 38 of the end 31b of the elongate piece 31. When the end of the piston rod 25b engages the indentation 38, the indicator 12 again will be in the position illustrated in FIG. 5. To ensure that the indicator 12 is not raised by substantially more than the 90° needed to bring the indicator from the position of FIG. 6 to the position of FIG. 5, a stop 39 may be provided adjacent to the axial bore 26 on that end of the body 11 which is provided with the ears 32. This will prevent the torsion spring 36 from being tensioned beyond capacity thereof.

The inventive indicating device 1 has been explained pursuant to one preferred embodiment. Numerous variations, which in no way detract from the inventive concept, are of course also possible. For example, in the drawings, some parts have been shown as being metal. These parts can made of be any suitable metal, preferably rustless metal, such as stainless steel or aluminum. Alternatively, all parts, other than the springs, could be made of synthetic material, such as nylon, PVC, polyethylene, etc.

To protect the indicating device 1 from the elements, and particularly from corrosion which could result in failure of the device, or from mud or water which could cause seizing or freezing of the moving parts, there is possible to place a thin protective latex boot 41 about the critical portion of the device. This boot 41 could extend from the indicator 12, and should cover that portion of the body 11 where the torsion spring 36 is accommodated. The boot 41 may be of any suitable material which permits the pivotal movement of the indicator 12 to be carried out in an unencumbered manner. There should be noted that this boot is by no means necessary, and is presently omitted in a preferred embodiment of the invention.

In place of the piston 25, the diaphragm 28 could be provided with a pin extending in the axial direction of the body 11 which would then serve the function of the piston rod 25b of the piston 25. On the other hand, the diaphragm itself could be replaced, with O-rings being provided around the outer periphery of the piston head 25a in order to provide a seal against compressed air leaking out around the piston head 25a. These O-rings would still permit displacement of the piston 25 in the manner described previously when the tire pressure falls below the predetermined level.

It also is possible to make the device 1 adjustable, so that one and the same device can be used with tires where a different minimum pressure is desired. This adjustability could be accomplished, for example, by having a threaded piston rod, which could then be made shorter or longer by screwing thereof into or out of the piston head. It also is conceivable to make the plug 21 adjustable in the body 11 relative to the piston 25 to thus alter the effective length of the piston rod 25b.

The torsion spring 36 has been described as a single torsion spring. However, of course, there also is possible to use a double torsion spring. In such a case, the two ends of the spring would be supported on the body 11 adjacent to the bore 26, or would be held in respective ears 32 of the body 11. The spring would be looped around the pin 35 on both sides of the end 31b of the elongate piece 31, and would have a loop which rests against the end 31b in a groove thereof, or would pass through the end 31b. This loop would press against the end 31b in the tensioned state of the spring, as does the spring 36 illustratd in the drawings.

In order to make the indicator 12 even more visible to the driver when located in the low pressure position, there also is possible to attach a flag to the end of the indicator 12. At any rate, the indicator 12 should be of a highly visible color, such as a bright yellow or chartreuse.

It is also possible to place a light in the indicator 12. This light could be connected to a battery (also accommodated in the indicator 12), and could be activated by a switch which is triggered at the same time that the indicator 12 is moved into its low pressure position (i.e. the position shown in FIG. 6). A lighted indicator 12 can be particularly useful for a driver traveling on a relatively empty highway where he might drive for a long period of time without having the headlights of a vehicle behind him to shine on an activated indicator 12.

Reference repeatedly has been made in the specification to a normal operating pressure of, for example, 100–110 psi. This is a common pressure for heavy road vehicles, such as tractor-trailer rigs or "semi's". This is one group of vehicles for which the inventive device is particularly useful. However, the device can just as easily be used for other categories of vehicles, such as recreation vehicles. In such a case, where a pressure of e.g. 30–35 psi may be normal, the inventive device is preset to actuate at a much lower pressure than previously described, such as 20–25 psi. The pressure at which the indicator 12 is released from one position to another is determined by any one or a combination of several factors, such as, for example, the length of the piston rod 25b, of elongate piece 31, and of the axial bore 26 in the body 11, and the strength of the torsion spring 36 and the diaphragm 28.

The present invention is, of course, in no way restricted to the specific disclosure of the specification and drawings, but also encompasses any modifications within the scope of the appended claims.

What is claimed is:

1. A device for indicating low compressed air pressure inflation in a vehicle tire having a rim and a valve stem with said rim as well as a rear-view mirror for the driver on at least one side of the vehicle, said device comprising:

means for attaching the device to the tire rim;
a hose connectable to said valve stem of said tire and containing means for communicating with the compressed air therein;
a body connected to and in communication with the interior of said hose for receiving compressed air from said hose;
an indicator which serves for visual indication of low pressure in tire inflation and which is pivotably attached to said body in a location remote from said hose, the indicator having a means connected therewith;
actuating means disposed in said body and responsive to the pressure of said compressed air for selectively holding said indicator in a first operating position during operation of the tire in a properly inflated state, and releasing said indicator, upon a drop in the pressure of said compressed air below a predeterminded level, to allow said indicator to pivot and assume a second, low-pressure position of visual indication of low pressure in tire inflation; said actuating means including a member adapted to mate with said means connected therewith such that said indicator is constrained from pivotal movement; and
resilient means external to and connected to the body said resilient means being means for effecting said pivotal movement of said indicator to said second, low-pressure position upon release of said indicator by operation of said actuating means to release said indicator from being constrained from pivotal movement; said device being structured such that said release of said indicator is followed by pivotal movement of said indicator into said second low-pressure position such that said indicator is visible to a driver or occupant inside a vehicle when the device is mounted on a tire rim of that vehicle.

2. A device according to claim 1, in which said body is substantially cylindrical, and includes one end thereof connected to and in communication with the interior of said hose, and includes another end provided with an axial bore which passes entirely through this end; said actuating means being partially disposed in said axial bore of said body, and being adapted to engage said indicator to effect said holding thereof in said first operating position.

3. A device according to claim 2, in which said actuating means comprises:

a piston displaceably disposed in said body and having a piston head located toward said hose, and a piston rod directed away from said hose toward said indicator, said piston rod extending in the axial direction of said body and being adapted to pass through and beyond said axial bore in said body for engagement with said indicator to effect said holding thereof in said first operating position;
a diaphragm disposed between said piston head and said hose on that side of said piston head remote from said piston rod, said diaphragm being acted upon by said compressed air to press against said piston head and urge said piston, and hence said piston rod, toward said indicator to effect engagement of said piston rod with said indicator; and
a compression spring placed around said piston rod between said piston head and that portion of said body in which said axial bore is located, said compression spring urging said piston head, and hence said piston rod, in a direction away from said indicator against the force of said diaphragm, with the force of said compression spring overcoming the force of said diaphragm upon occurrence of a drop in the pressure of said compressed air below a predetermined level, thus allowing displacement of said piston, and hence said piston rod, away from said indicator to release same and to allow said indicator to pivot and assume said second, low-pressure position.

4. A device according to claim 3, in which said pivotal connection of said indicator to said body is effected by an elongate piece, one end of which is secured to said indicator, and the other end of which is pivotably attached to said body in the vicinity of said axial bore thereof.

5. A device according to claim 4, in which said body has two ears in the vicinity of said axial bore, each of said ears being provided with a bore which passes entirely therethrough and extends perpendicular to the axis of said axial bore, said bores of said ears being aligned with one another; in which said elongate piece is provided with a bore in the region of that end thereof remote from said indicator; and in which a pin passes through the bores of said ears and through said bore of said elongate piece to effect said pivotable attachment of said elongate piece to said body.

6. A device according to claim 5, in which that end of said elongate piece remote from said indicator is provided with an indentation for receiving that end of said piston rod remote from said piston head to effect said holding of said indicator in said first operating position.

7. A device according to claim 6, in which said means for effecting said pivotal movement of said indicator to said second, low-pressure position upon release of said indicator by said piston rod is a torsion spring which is wrapped around said pin between one of said ears of said body and that end of said elongate piece remote from said indicator; said torsion spring being operatively associated with said body and said elongate piece in such a way that when said indicator is released by said piston rod from said first position, said torsion spring effects pivotal movement of said indicator by urging it into said second, low-pressure position.

8. A device according to claim 7, which includes means for effecting said connection of said body with said hose, said means being in the form of a plug comprising a disc-like portion secured to said body, and a stepped portion secured to said hose, said plug being provided with a bore which passes entirely through said disc-like portion and said stepped portion to effect said communication of said body with the interior of said hose.

9. A device according to claim 8, which includes a thin and very flexible boot placed around at least that portion of said device which accommodates said torsion spring.

10. A device according to claim 8, which includes a clip fastened to said body for effecting attachment of said device to a wheel rim on which is mounted the tire with which said device is associated.

11. A device according to claim 10, which includes a stop located on said body in the vicinity of said axial bore to prevent said indicator from being pivoted from said second position substantially past said first position.

12. A device according to claim 8, which includes a supplemental valve stem unit attached to said hose and adapted to communicate with the interior thereof, said supplemental valve stem unit being adapted to be connected to a source of compressed air.

* * * * *